Jan. 14, 1930.  A. E. OSWALD  1,743,682
BRUSH FOR ELECTRIC MOTORS
Filed June 27, 1924
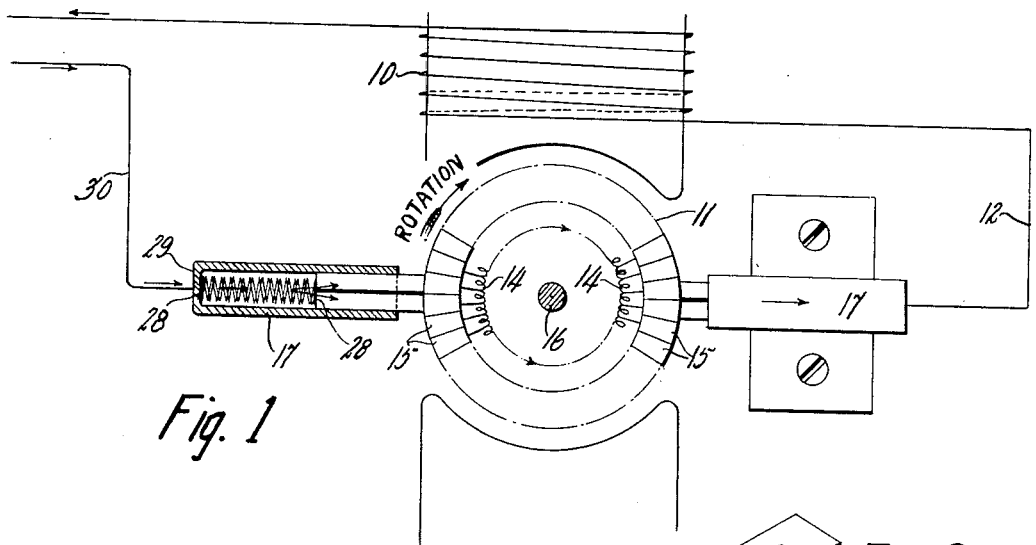
Fig. 1
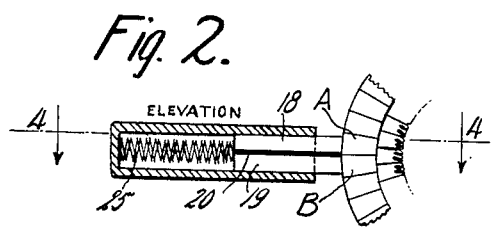
Fig. 2
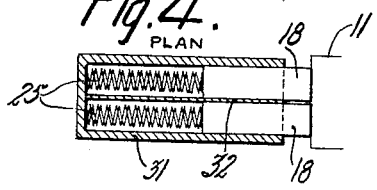
Fig. 4
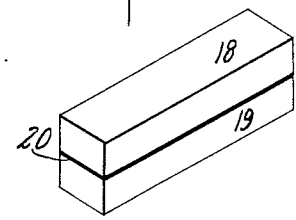
Fig. 3
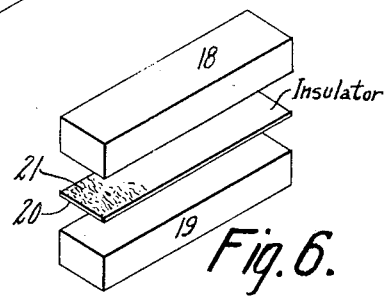
Fig. 5  Fig. 6
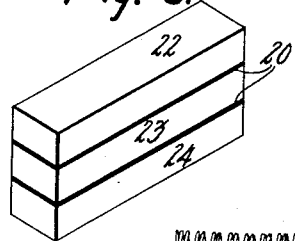
Fig. 7
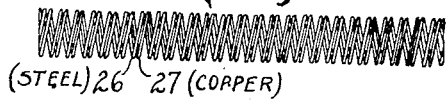
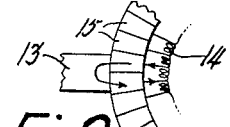
Fig. 9
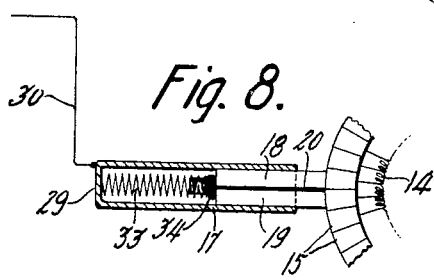
Fig. 8
Inventor:
Alfred E Oswald
by B.C. Stickney
Attorney Patented Jan. 14, 1930

1,743,682

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

BRUSH FOR ELECTRIC MOTORS

Application filed June 27, 1924. Serial No. 722,647.

This invention relates generally to the construction and mounting of brushes which contact with the commutators of dynamos and motors, particularly in alternating current circuits of commercial voltages. Certain features of the invention are also useful for direct current circuits.

The revolving commutator is usually composed of a circular row of segments insulated from one another and connected in the form of terminals in individual coils grouped about the shaft of the revolving armature. Stationary brushes usually press upon the opposite sides of the periphery of the commutator and are usually made out of blocks or sticks of carbon or other material. In an alternating motor these brushes usually occupy positions midway of the field poles. This arrangement is found in practice to give rise to local short-circuited currents. The lines of force in the alternating current field cut the individual coils which are separately connected to the segments. This effect occurs in the coils which momentarily are in contact with the brushes. Individual local currents are thus generated in such coils at the moment, these local currents being high, and having low voltage. The local current passes through the coil whose segments are momentarily in contact with a brush.

These local currents are only temporary, but they form and disappear in rapid succession, and produce heat and are therefore an objection. Moreover they consume power, which is a further objection. Again, since the contacts are constantly being made and broken as the commutator revolves, there results a constant succession of sparks, which is objectionable in all cases, and moreover tends to reduce the efficiency of the motor and impair and shorten the life of the commutator and wear away the brushes.

The end of the brush itself completes the circuit for such local current, and hence favors the generation of the same. The reason is that said brush end contacts temporarily with two or more of the segments or contacts in the commutator, thus enabling it to join said segments electrically and temporarily complete a circuit.

According to the present invention, this difficulty is minimized or practically overcome by substantially minimizing the time during which the brush itself may electrically join adjacent commutator segments as just explained. For this purpose the brush or block of carbon is split longitudinally throughout its length, and between its portions is inserted a separating layer comprising paper or other insulator. Since current cannot pass through such insulator, the end of the brush, as a whole, is substantially prevented from completing a local circuit, and the formation of local currents is disfavored or minimized.

Another feature of the invention is an improvement in the means for pressing the brush against the commutator, and this improvement is also useful in connection with the usual undivided brush. Heretofore the brush has been inserted endwise into a metal holder, cell, socket or housing, and a helically coiled compression spring has been inserted, bearing at one end against the brush, and at the other end against the outer end or terminal of the housing. The latter is made of metal, and the spring has served as the main path for the current from the socket to the brush. It has been found that the spring, being made of resilient metal, offers obstruction to the flow of the current, and therefore becomes heated, and it also tends to receive heat from the brush itself, and from the sparking in some instances; and it has been found that the end portion of the spring which presses against the brush becomes overheated and softens and loses its efficiency and shape. This trouble often arises from the starting or overload current, and it has been proposed to overcome it by the use of phosphor bronze springs.

To overcome this difficulty, there is made a coil which is double wound, one winding being of steel or other spring wire, and the other winding being of soft copper wire. The spring being a relatively poor conductor, and the copper wire being a relatively good conductor, the current divides and tends to flow almost entirely through the copper wire, while only a little current flows through the steel spring, and hence heating of the latter is minimized or avoided.

Other features and advantages will hereinafter appear.

In the accompanying drawings,

Figure 1 is a diagram showing the present improvements in brush devices, the commutator and field of an alternating motor being indicated diagrammatically.

Figure 2 is a sectional elevation of the device seen at Figure 4.

Figure 3 is a perspective view of one form of improved brush.

Figure 4 is a sectional plan showing independent improved brush devices in one box, housing or holder.

Figure 5 is a perspective of a brush comprising three insulated sections.

Figure 6 shows the brush sections separated from the intervening insulator.

Figure 7 shows a double helix, one member being of spring steel and the other being of soft copper wire.

Figure 8 shows another means of preventing overheating of the brush spring.

Figure 9 is a diagram to explain the manner in which the end of the brush temporarily completes the local circuit forming a short-circuit current in an ordinary motor.

A motor usually comprises a stationary field coil 10 and a commutator 11, the latter connected in series with a field circuit 12 by means of stationary brushes 13 (Figure 9) which press upon the commutator, the latter usually comprising individual coils 14 electrically connected to segments 15, which are built up to form the circular commutator, which revolves upon the armature shaft 16.

Each brush, which slides in a fixed metal housing 17, comprises sections 18, 19, between which is interposed a paper or other insulator 20, secured to both sections by adhesive 21, Figure 6, such, for example, as ordinary library paste. This built-up brush is strong, substantial and efficient. It is placed in the housing 17 in such a manner that as the two sections 18, 19 are simultaneously in contact with adjoining segments 15 in the commutator (as indicated at A and B, Figure 2), the insulator or brush-divider 20 prevents a local circuit being completed, as across the fully divided brush-sections 18, 19, through that local coil 14, whose segments A, B are temporarily contacting with the brush. This minimizes or eliminates the local short-circuit current, with the benefits already explained.

The paper extends the full length of the carbon, and continues to serve its purpose as the end of the carbon is worn off.

For causing the paper to adhere to the carbon, there may be used ordinary library paste. Other adhesive may be used, or other insulator employed.

The thickness of each section of the brush may be nearly equal to the thickness of a commutator segment. It is observed that even when the two halves of the brush are separated by the insulator 20, there may still be a residual fraction of time in which there is opportunity for a local circuit to be completed through one of the halves 18 or 19 of the brush; but in practice, owing to the speed of the commutator, this time is too small for the local current to form, and little or no difficulty is experienced; the main trouble being eliminated by the use of the device seen at Figure 3. However, if desired, the form used at Figure 5 may be employed, in which the brush is divided into three thin sections 22, 23, 24, instead of the two thick sections 18, 19; and these thin sections may be fully separated by the insulators 20. When using either the Figure 3 form or the Figure 5 form, the trouble from the local short-circuit current is practicably negligible; the Figure 5 form being useful when it is desired to secure a higher degree of elimination than at Figure 3; the invention not being limited to either two or three part brushes.

As seen at Figure 4, two composite brushes may be used side by side and independently pressed against the commutator, each brush formed as at Figure 3 or Figure 5.

An improved device for connection with the brush (whether of the improved type shown at Figures 1 to 8 or the type seen at Figure 9), is illustrated at Figure 7, in the form of a double helical winding 25. This is composed of a spring 26, which may be of tempered steel and presses the brush against the commutator, and a copper wire 27, which at its ends may be joined to the ends of the spring by solder 28 or otherwise, and serve to conduct the major portion of the electrical current from the closed end 29 of the housing 17 to the brush 18, 19 or 13. The current passing into said end 29 from a line wire 30 is divided, the main portion passing through the copper helix because of its great conductivity, and only a little through the spring 26, so that the latter does not become heated but maintains its form, temper and efficiency throughout a long life. Some of the current will also pass directly from the sides of the housing 17 into the brush, which is an advantage, particularly where the brush is divided into three or more sections, as at Figure 5. It will be understood that other equivalent metal of high conductivity may be employed for the wire 27.

The advantage of winding the high conductivity wire 27 into a helix, which helix is preferably interwound with the spring 26, is that the wire 27 so wound may be easily assembled with said spring and brush in the brush-housing, and may conveniently be pressed by the spring into close contact with brush and housing. It conduces particularly to good contact of the wire 27 with the brush and housing if the ends of the wires 26 and 27 are joined by solder, as suggested. It is obvious that, where the wires 26 and 27 are interwound and confined in such manner as to adhere substantially throughout the length of the respective wires, soldering of the ends may not be necessary. A helical winding for the wire 27 is easily extended or compressed according to the extension or compression of the spring, and thus also conduces to uniformity of brush-pressure.

As another means for preventing overheating of the brush or spring, the end of the spring is insulated from the brush, so that no current flows through the spring, but the brush receives the entire current from direct contact with the metal housing in which it slides, said housing forming a part of the circuit.

At Figure 4 there is shown a double housing 31 divided by a metal partition 32 into two sockets for the brushes, which are arranged in pairs side by side. In each socket is the described combination spring and conductor forming the double helix seen at Figure 7.

At Figure 8 is illustrated a device in which the entire current passes directly from the sides of the housing 17 into the brush 18, 19; a single helix 33 being shown, consisting of a spring which at its outer end bears against the closed end of the housing and at its inner end bears against the insulating washer 34, so that no current passes through the spring, and hence it does not become heated and thereby impaired. When the brush wears away, the motor will slow down or stop, since no current can pass through the spring to the commutator, and since the holder is out of contact with the commutator.

Variations may be resorted to within the scope of the invention, and portions of the improvements may be used without others.

Having thus described my invention, I claim:

In an electric motor, the combination of an armature having a commutator, of a brush including a plurality of separate conducting brush-elements electrically insulated from each other, a holder for supporting said elements in the motor, and a straight double-wound helical compression spring member included in said holder, one winding formed of material having high electrical conductivity and the other winding formed of material having high resiliency, said spring-member being effective to press each of said elements individually against the commutator and conduct current individually to each element.

ALFRED E. OSWALD.